United States Patent

Joshi

(10) Patent No.: US 9,813,979 B2
(45) Date of Patent: Nov. 7, 2017

(54) VOICE CALL HANDOVER

(75) Inventor: Venkatesh Joshi, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 244 days.

(21) Appl. No.: 13/279,174

(22) Filed: Oct. 21, 2011

(65) Prior Publication Data

US 2013/0100821 A1 Apr. 25, 2013

(51) Int. Cl.
*H04W 48/20* (2009.01)
*H04W 48/06* (2009.01)

(52) U.S. Cl.
CPC ............ *H04W 48/20* (2013.01); *H04W 48/06* (2013.01)

(58) Field of Classification Search
CPC .... H04W 36/22; H04W 36/38; H04W 36/385
USPC ......... 370/230, 241, 331; 455/436, 438, 439
See application file for complete search history.

(56) References Cited

U.S. PATENT DOCUMENTS

| | | | |
|---|---|---|---|
| 2005/0136928 A1* | 6/2005 | Zaki | 455/436 |
| 2005/0208950 A1* | 9/2005 | Hasse | 455/453 |
| 2006/0128392 A1* | 6/2006 | Turina et al. | 455/452.1 |
| 2007/0060127 A1* | 3/2007 | Forsberg | 455/436 |
| 2011/0103233 A1* | 5/2011 | Shu et al. | 370/241 |
| 2011/0250891 A1* | 10/2011 | Zou et al. | 455/437 |

FOREIGN PATENT DOCUMENTS

WO  WO 2010003340 A1 * 1/2010

OTHER PUBLICATIONS

Simsek et al. "Analysis of the QBSS Load Element Parameters of 802.11e for a priori Estimation of Service Quality" 2006.*
IEEE 802.11r "Amendment 2: Fast Basic Service Set (BSS) Transition" Jul. 11, 2008.*
Merriam-Webster Online "definition of term include" Jan. 18, 2006, retieved Sep. 29, 2016 from Archive.org.*

* cited by examiner

*Primary Examiner* — Robert M Morlan
(74) *Attorney, Agent, or Firm* — Hewlett Packard Enterprise Patent Department

(57) ABSTRACT

Transitioning voice clients among network resources. A network monitor using IEEE 802.11e QBSS Load IE elements monitors the load on one or more wireless access points. When the load on an access point, as reported in the QBSS Load Element IE exceeds a predetermined threshold, the network monitor sends a message to that AP which causes the AP to send BSS Transition Management Request frames to all connected voice clients which are currently idle. The information passed to the AP and then to the client may include one or more neighboring APs with capacity.

21 Claims, 1 Drawing Sheet

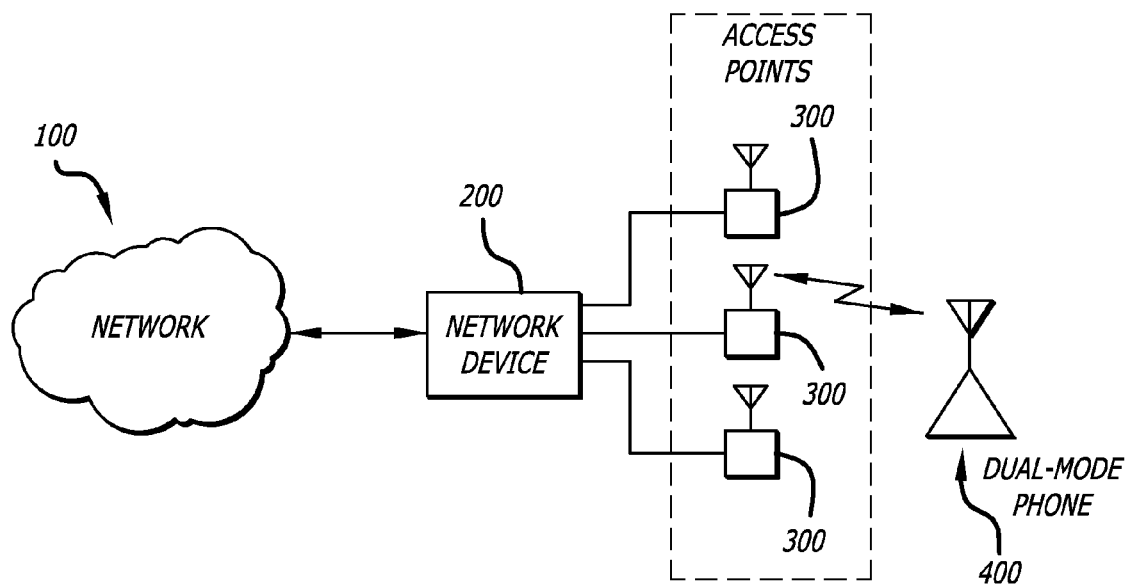

VOICE CALL HANDOVER

BACKGROUND OF THE INVENTION

The present invention relates to dual-mode phones which support both Wi-Fi and Cellular connections.

Dual-mode phones, which support calls over Wi-Fi or Cellular connections are becoming more popular. With a good supporting infrastructure, users can initiate calls in one system, such as cellular, and transition to the other system, Wi-Fi, when in range of a supporting Wi-Fi system. Users can also transition from one Wi-Fi access point (AP) to another Wi-Fi AP.

But supporting voice over Wi-Fi systems is a challenge. To maintain a high Quality of Service (QoS) on voice calls, a stringent set of bandwidth, delay, jitter, and packet loss metrics must be continuously met.

As a network becomes more loaded with all types of traffic, QoS on voice calls will degrade. This degradation may occur on one AP in a network, with other nearby APs having capacity.

What is needed is a way to trigger the handover of voice calls to alternate networks when QoS degrades.

BRIEF DESCRIPTION OF THE DRAWINGS

The invention may be best understood by referring to the following description and accompanying drawings that are used to illustrate embodiments of the invention in which:

FIG. 1 shows devices in a network.

DETAILED DESCRIPTION

Embodiments of the invention relate to methods of transitioning voice clients among wireless networks. Using IEEE 802.11e QoS Basic Service Set (QBSS), a monitor process in a network monitors the load on wireless Access Points (APs). When the monitor senses that an AP has passed above a preset load threshold, it will alert the AP, which will send BSS Transition Management frames to all associated voice clients which are currently idle.

According to the present invention and as shown in FIG. 1, dual-mode phone 400 connects through wireless access point (AP) 300 to network 100. Network monitor 200 monitors wireless access points 300.

As is understood in the art, network device 200 is a purpose-built digital device containing a processor, a memory hierarchy, and input/output interfaces. Such devices typically operate under the control of an operating system such as Linux, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

Similarly, APs 300 are also purpose-built digital devices, containing a processor, a memory hierarchy, and input/output interfaces. Such devices typically operate under the control of an operating system such as Linux, running specific programs to provide for access point operation. A MIPS-class processor such as one from Cavium or NetLogic—RMI may be used. Wired network interfaces typically are IEEE 802.3 Ethernet interfaces. Wireless interfaces are typically IEEE 802.11 WiFi interfaces. The memory hierarchy of the device typically contains fast read-write memory for holding programs and data during device operation, and a hierarch of persistent memory such as ROM, EPROM, and Flash for holding instructions and data needed for device startup, and a file system for device operation.

While network monitor 200 is shown as a separate device attached to the network, it may also be implemented as a process running for example on one or more access points 300, on a controller (not shown) supporting access points 300, or on another suitable network device such as a server, switch, or router.

Dual-mode phone 400 is also a purpose-built digital device, containing processor, memory hierarchy, and input/output interfaces such a s a display, speaker, microphone, and radios typically for both 802.11 Wi-Fi and cellular communications.

For clarity, FIG. 1 does not show other typical network devices such as switches, routers, firewalls, and the like which are well understood by the art.

According to the present invention, network device 200 monitors the status of APs 300 using IEEE 802.11e QBSS Load Element messages. IEEE802.11e-2005 is an amendment which has been incorporated into the IEEE 802.11-2007 standard.

As part of 802.11e, AP 300 advertises the QBSS Load IE element in beacon frames. This load element consists of at least: station count, channel utilization, and available admission capacity.

According to the invention, network monitor 200 tracks QBSS Load Element IE data for the APs 300 in its domain. This may be performed in a number of ways. APs 300 may send QBSS Load Element IE data to network monitor 200. APs 300 may report QBSS Load Element IE data on beacon frames received from other APs and forwarding those to network monitor 200.

When predetermined limits are crossed on one or more of station count, channel utilization, and/or available admission capability on an AP, network monitor 200 sends a message to that AP which causes it to send a BSS Transition Management Request frame to all associated voice clients which are idle.

It should be noted that under IEEE standards, the wireless client device is responsible for deciding when to transition and the destination for the transition, which may be a different AP, or a cellular connection. Fast transitions by the client may be accomplished using IEEE 802.11r.

Optionally, network manager 200 may include identification of other APs 300 which have capacity.

The present invention may be realized in hardware, software, or a combination of hardware and software. A typical combination of hardware and software may be a network server or access point with a computer program that, when being loaded and executed, controls aspects of the host device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

I claim:

1. A computer implemented method, comprising:
receiving, at a network monitor including one or more hardware processors, one or more beacon frames including load elements that characterize WiFi access point loads for associated WiFi access points;
determining that a WiFi access point load of the WiFi access point loads exceeds a threshold load; and
in response to a determination that the WiFi access point load of the WiFi access point loads exceeds the threshold load, transmitting a message from the network monitor to a WiFi access point of the WiFi access points, wherein the WiFi access point is associated with the WiFi access point load, wherein the message comprises an instruction to cause the WiFi access point to send a transition management message to a subset of voice clients, wherein the subset of voice clients includes all idle voice clients associated with the WiFi access point, and wherein the transition management message comprises an instruction to cause an idle voice client of the idle voice clients to transition to another WiFi access point.

2. The method of claim 1, further comprising: identifying a further WiFi access point that has capacity.

3. The method of claim 2, wherein the message from the network monitor to the WiFi access point identifies the further WiFi access point, and wherein the transition management message comprises the instruction to cause the idle voice client to transition to the further WiFi access point.

4. The method of claim 1, wherein receiving one or more beacon frames includes receiving one or more beacon frames from the WiFi access points within a network domain.

5. The method of claim 1, wherein the one or more beacon frames include an IE load element or IE QBSS Load Element data.

6. The method of claim 1, wherein the transition management message includes a BSS Transition Management Request frame.

7. The method of claim 1, wherein the transition management message comprises the instruction to cause the idle voice client to transition to the another WiFi access point using a fast access point transition.

8. A system comprising:
one or more hardware processors;
a non-transitory computer readable storage medium communicatively coupled to the one or more processors, wherein the non-transitory computer readable storage medium includes instructions that, when executed by the one or more hardware processors, cause the one or more hardware processors to perform operations including:
receiving one or more beacon frames including load elements that characterize WiFi access point loads for associated WiFi access points;
determining that a WiFi access point load of the WiFi access point loads exceeds a threshold load; and
in response to a determination that the WiFi access point load of the WiFi access point loads exceeds the threshold load, transmitting a message to a WiFi access point of the WiFi access points, wherein the WiFi access point is associated with the WiFi access point load, wherein the message comprises an instruction to cause the WiFi access point to send a transition management message to a subset of voice clients, wherein the subset of voice clients includes all idle voice clients associated with the WiFi access point, and wherein the transition management message comprises an instruction to cause an idle voice client of the idle voice clients to transition to another WiFi access point.

9. The system of claim 8, wherein the non-transitory computer readable storage medium further includes instructions that, when executed by the one or more hardware processors, cause the one or more hardware processors to perform operations including:
identifying a further WiFi access point that has capacity.

10. The system of claim 9, wherein the message to the WiFi access point identifies the further WiFi access point, and wherein the transition management message comprises the instruction to cause the idle voice client to transition to the further WiFi access point.

11. The system of claim 8, wherein receiving one or more beacon frames includes receiving one or more beacon frames from the WiFi access points within a network domain.

12. The system of claim 8, wherein the one or more beacon frames include an IE load element or IE QBSS Load Element data.

13. The system of claim 8, wherein the transition management message includes a BSS Transition Management Request frame.

14. The system of claim 8, wherein the transition management message comprises the instruction to cause the idle voice client to transition to the another WiFi access point using a fast access point transition.

15. A non-transitory computer readable storage medium comprising instructions that, when executed by one or more hardware processors, cause the one or more hardware processors to perform operations including:
receiving one or more beacon frames including load elements that characterize WiFi access point loads for associated WiFi access points;
determining that a WiFi access point load of the WiFi access point loads exceeds a threshold load; and
in response to a determination that the WiFi access point load of the WiFi access point loads exceeds the threshold load, transmitting a message to a WiFi access point of the WiFi access points, wherein the WiFi access point is associated with the WiFi access point load, wherein the message comprises an instruction to cause the WiFi access point to send a transition management message to a subset of voice clients, wherein the subset of voice clients includes all idle voice clients associated with the WiFi access point, and wherein the transition management message comprises an instruction to cause an idle voice client of the idle voice clients to transition to another WiFi access point.

16. The non-transitory computer readable storage medium of claim 15, further comprising instructions that, when executed by the one or more hardware processors, cause the one or more hardware processors to perform operations including:
identifying a further WiFi access point that has capacity.

17. The non-transitory computer readable storage medium of claim 16, wherein the message to the WiFi access point identifies the further WiFi access point, and wherein the transition management message comprises the instruction to cause the idle voice client to transition to the further WiFi access point.

18. The non-transitory computer readable storage medium of claim 15, wherein receiving one or more beacon frames includes receiving one or more beacon frames from the WiFi access points within a network domain.

19. The non-transitory computer readable storage medium of claim 15, wherein the one or more beacon frames include an IE load element or IE QBSS Load Element data.

20. The non-transitory computer readable storage medium of claim 15, wherein the transition management message includes a BSS Transition Management Request frame.

21. The non-transitory computer readable storage medium of claim 15, wherein the transition management message comprises the instruction to cause the idle voice client to transition to the another WiFi access point using a fast access point transition.

\* \* \* \* \*